United States Patent [19]

Lovett

[11] 4,450,477

[45] May 22, 1984

[54] TELEVISION INFORMATION SYSTEM

[76] Inventor: Bruce E. Lovett, 1005 Congress La., McLean, Va. 22101

[21] Appl. No.: 363,959

[22] Filed: Mar. 31, 1982

[51] Int. Cl.³ .............................................. H04H 7/18
[52] U.S. Cl. ..................................... 358/86; 358/142; 455/5
[58] Field of Search ................. 358/86, 102, 142, 903; 455/5

[56] References Cited

U.S. PATENT DOCUMENTS

| | | | |
|---|---|---|---|
| 2,064,938 | 12/1936 | Monk | 455/53 |
| 4,135,213 | 1/1979 | Wintfeld et al. | 358/142 |
| 4,148,066 | 4/1979 | Saylor | 358/142 |
| 4,381,522 | 4/1983 | Lambert | 358/86 |

Primary Examiner—Howard W. Britton
Assistant Examiner—Edward L. Coles
Attorney, Agent, or Firm—Banner, Birch, McKie & Beckett

[57] ABSTRACT

This television information system transmits selected video picture information to one of a number of subscribers who have television sets connected to the system. First, the subscriber makes a selection by transmitting a request to the head end. A central computer interprets the request, searches the available data banks for the information, and records it. Next, the information along with an identifying number is returned to the system and sent to a control station.

At the control station, the identifying number is used to route the information to a particular modulator associated with the subscriber who made the request. The information is stored and used to modulate a unique carrier frequency which has been dedicated to that subscriber.

The control station sends the modulated carrier frequency (containing the selected information) to a feeder line to which may be connected a number of subscribers, including the one who made the request. If the requesting subscriber's television set is tuned to his carrier frequency, he can receive the requested information. Privacy is assured by dedicating to each subscriber a different carrier frequency and associated television channel, and by filtering out all other channels which might be transmitted on the feeder line.

Standard, unmodified television sets may be used with this system; and rapid retrieval of information from large data banks is possible.

38 Claims, 13 Drawing Figures

VIEWDATA TERMINAL BUILT INTO RECEIVER
PRIOR ART

TELEVISION INFORMATION SYSTEM

BACKGROUND OF THE INVENTION

Cable Television

A significant proportion of television entertainment is presently delivered by way of cable television systems. In general, these systems can receive broadcast television signals on a common antenna or set of antennas, amplify the signals, and distribute them along transmission lines either at their original frequencies or after conversion to different frequencies. The transmission lines are connected to the television sets of the system's subscribers, usually through a decoding or filtering device which is intended to prevent non-subscribers from receiving the signals. Frequency conversion is often necessary in systems which handle programs broadcast from outside the local area, since there is a good chance that signals will be received from two different stations which operate on the same channel. (A standard broadcast television channel in the United States is a band of frequencies 6 MHz in width.)

Cable television systems are also well suited to transmit nonbroadcast programming to their subscribers. Such programs originate within the cable television system itself, for example by displaying a motion picture to a television camera and using the resulting electrical signal to modulate a carrier freqency.

In either case, cable television systems consist of four main parts: a head end, the main trunk cable distribution system, feeder cables and drops from feeder cables to the subscriber's TV set. A cable television head end includes the television receiving antennas for off-air pick up and microwave and/or satellite receivers for other direct television programming as well as equipment that originates local programming. From the head end, trunk lines transport the signal to feeder lines which carry signals past each home.

The integrity of trunk cables is not meant to be breached by tapping off signals for direct distribution to subscriber homes. Rather this is accomplished with a feeder cable. The signals on feeder cables come from amplifiers (bridger amplifiers) bridged across the trunk cable at distribution points. Therefore, in many cases, feeder cables must parallel or backtrack side-by-side with the trunk cable in order to have a cable that can be tapped to feed a signal to subscribers. Signal losses in feeder cables may require line extender amplifiers approximately every 1500 feet. These multi-channel amplifiers cause problems themselves. Repeated amplification of broadband television signals causes noise, intermodulation distortion and echoes, increasing with each amplification, thereby limiting the distance that signals can be transmitted while maintaining a given standard of picture quality.

Cable losses increase with frequency as well as with distance. Thus, the superband VHF portion of the cable spectrum, 216 to 300 MHz, is subject to greater loss than the highband and lowband VHF, 54 MHz to 216 MHz.

While the TV channel allocation spans the spectrum from 54 to 890 MHz, a cable television system utilizes only a small part of this spectrum. The first cable television systems were built in the early 1950's to provide broadcast channels to subscribers in areas that could not receive off-air signals. These early 5-channel systems used the standard television frequencies from 54 to 88 MHz for distribution of these broadcast channels. When the state of the art advanced to include 12 channels, cable used the high VHF spectrum of 174 to 216 MHz as well. These 12 channels could be received without a converter. To increase to 21 channels, cable systems used the midband spectrum from 108 to 174 MHz to add nine additional channels; these channels required using a frequency converter since the television set tuners could not accommodate these midband channels. Current 35-channel systems add 14 additional channels by using 216 to 300 MHz. To accomplish this, frequency converters were upgraded. Plans exist now to add another 25 channels, extend the cable television spectrum to 450 MHz. Thus, as cable television systems add channels, they use increasingly higher frequencies. This can only be done at the cost of greater signal attenuation.

The upper frequency limit on trunks is established by the performance of linear broadband amplifiers and by trunk cable attenuation, which increases with increasing frequency. Feeder cable length is limited to about 1500 feet by the attenuation at the highest frequencies carried on the feeder. Therefore, the gap between the highest VHF television frequency at 216 MHz and the lowest UHF television frequency at 470 MHz establishes a natural barrier to attempted carriage of both VHF and UHF signals on a cable system.

Bidirectional Unicable Switching System

An improvement in cable television system technology was introduced by U.S. Pat. No. 4,077,006, issued to Nicholson on Feb. 28, 1978. Briefly, the Nicholson patent describes a bidirectional cable television system in which each subscriber has a dedicated television carrier frequency and channel for receipt of any signals which the system is capable of sending to that subscriber, except for FM radio broadcasts which are sent to everyone at the original frequencies (in the band from 88 to 108 MHz). The heart of Nicholson's system is the control station at the head of each feeder line (at its intersection with the trunk line). The control stations receive all incoming television programs transmitted along the trunk line, as well as requests from subscribers who wish to view a particular channel. The incoming channels are first converted to a single intermediate frequency channel, then the particular program that a subscriber wishes to view is routed by switches to a frequency converter which converts it to the subscriber's dedicated channel. The selected program is finally output to the feeder line together with programs requested by other subscribers and converted to their dedicated channels. At the subscriber terminal, one bandpass filter separates FM radio broadcasts from the feeder line, and another separates the programming which was converted to that subscriber's dedicated channel. For further details regarding this system, the reader is referred to the Nicholson patent itself.

Videotext Systems

In the past few years, the revolution in information technology has led to the research, development and field testing of "videotext" systems—a technology which uses electronic devices for the widespread dissemination and retrieval of information. These systems have in common the ability to allow subscribers access to large data bases of information using a modified or adapted television terminal.

While there is little doubt that these "electronic newspapers" have widespread applicability, use on a mass basis has been delayed by the high costs of developing these new technologies and by the perceived obstacles to acceptance by consumers and information providers (cost of terminal equipment, cost of system usage, primitive display systems). While existing system delineations are blurred, the following summary categorizes them as either "viewdata" or "teletext."

Teletext systems are one-way videotext systesm in which information in digital form is placed on unused portions of the television signal by means of special terminal equipment built-in or attached to a television set. Unlike viewdata, where the subscriber interacts individually with the data base, in teletext the complete data base is cycled continuously and it is available simultaneously to all subscribers. Using a keypad, the desired information is selected by the subscriber as it is cycled, stored in a local memory, decoded and formatted for use by a character generator, and displayed on a television receiver.

In the United States the makeup of a television picture limits, for all practical purposes, information transmission of teletext to only two lines (17 and 18) of the Vertical Blanking Interval (VBI). Therefore, the potential size of the teletext data base is limited by the amount of information that can be cycled in a time period acceptable to the subscriber. Using these two lines, 90 pages of text can be cycled in 60 seconds; field trials have indicated that this is an unacceptable limit. Experiments using VBI lines below 17 and 18 to increase the information capacity have not been very successful.

Teletext has many obstacles to widespread use and consumer acceptance. Some of the most obvious are the retrieval time and size of the data bank, the cost of equipment in the home, the rudimentary graphics, and the absence of privacy. Because the subscriber selects information as it is cycled, the size of the data bank is limited by an acceptable waiting time. In the U.S. where only 2 lines of the VBI are available for data transmission, teletext is, for all practical purposes, still a narrowband and consequently slow system. To use the teletext system, the subscriber must rent or purchase a modified television receiver with a keypad, a decoder with memory, a character generator for visual display, and a page grabber. A less-sophisticated version has a keypad, set top modulator and decoder. Even the most primitive terminals presently cost several hundred dollars more than conventional television. Even with mass production, the terminal costs will be too great for the occasional user. The primitive alphanumeric and graphic displays have limited marketability. Because all subscribers have access to the same information at the same time, teletext has limited acceptability for information providers who want to restrict their information to special users. Teletext also has limited appeal to information providers because the one-way system makes it impossible to record and change for the specific page requested.

Viewdata is a narrowband, interactive switched system employing telephone lines to transport information from data banks to subscribers. In a viewdata system, typically the subscriber requests information via a keypad or a keyboard attached to a telephone line. This information, stored either in central or localized data banks, is forwarded to the subscriber in page packets, stored in the interactive "terminal" and formatted for display on a color television receiver. The display consists of alphanumeric characters and stylized graphics.

Access to viewdata systems involves individualized, interactive tree searches. An information request leads the subscriber to general information; the subscriber refines his request, which leads to more specific pages. Thus, the process often involves several interactions before the subscriber obtains the desired information.

Information providers therefore face a major challenge: to design the "search" system to ensure that the subscriber does not get lost or frustrated in his data search. The information provider, in structuring his information, must think like his subscriber and must strive to create a "friendly system" which will allow the subscriber to retrieve the desired information with as little trouble as possible.

To accomplish this interaction, typical viewdata terminal equipment consists of a keyboard, microprocessor, memory, display controller, a color television and a 1200 bit/s modem to allow transmission of digital data over standard telephone lines. A separate dedicated telephone drop is needed to avoid tying up regular telephone service. The narrow telephone bandwidth limitation of the viewdata system frequently results in lengthy retrieval intervals. For example, in a typical viewdata system, a simple tree search, involving perhaps five interactions, can often take 60 seconds because of the wait time necessary for each page to be displayed on the television screen (6 to 11 seconds per page). A more complex search can take even longer.

In addition, while the system allows the subscriber access to a very large central data base, or an unlimited number of localized or specialized data bases, the system can easily be overloaded when subjected to very many simultaneous requests.

Because each information request is individualized—only the subscriber receives the information requested over his own private telephone line—the system can be adapted for groups requiring a secure channel.

Typically, the graphic display systems for viewdata are rudimentary; they are not capable of producing true photographic representations. Instead, alphanumerics and picture-like graphics are produced by using a mosaic sub-element matrix of two columns and three rows per character. The process is primitive and slow. A second generation viewdata system, now under development, has refined graphic capability. Its graphic display of 960 lines by 1280 picture elements, 1,228,800 pixel locations, provides nearly 20,000 times as much detail as the earlier systems. This refinement is not without its tradeoffs: the system's alpha-geometric decoder costs nearly ten times that of a first generation decoder; further, transmitting a graphic image using this "best case" stylized graphic system may take hours.

While exhibiting much potential, the widespread adoption of viewdata systems faces several types of obstacles, including length of retrieval time and complexity of the search process, cost of equipment in the home, cost of using the system, and rudimentary graphics.

The use of narrowband telephone equipment means that a simple request may take as long as 60 seconds; more complex requests may involve much longer times. Because of the interactive nature of the system, a subscriber may become frustrated in his search if the information is not sufficiently coded and cross referenced. The subscriber may not find what he needs.

In order to use a viewdata system, the subscriber, in addition to a dedicated telephone line, needs an adapted television receiver equipped with a keypad, memory, microprocessor, and display controller. Prototype models cost approximately $2,000-$3,000. Even if mass production could substantially reduce the price at a target of 50% more than a standard color television, only the most serious subscribers (businesses and professionals) could afford the system.

A typical system involves three charges: a local telephone call, an overall charge for the use of the system on a per minute basis (with variations for peak or off-peak usage), and a price for accessing the data base. This last charge is a per-page price established by the information provider. Rates vary according to the type of information requested, ranging from $0.02 to a maximum of $1.00 per page. Advertisements may be free, an index to information available at nominal rates, and specialized, technical information commanding the highest rates. Thus, a typical request may cost $0.25 a page, far above the cost of a daily newspaper or even a phone call to elicit the equivalent information.

While the display can present textual information adequately, the inability to reproduce photographs makes these systems poor candidates for mass marketing where the ability to see the actual product and compare it with similar products is essential.

Cable Television Systems With Videotext

Cable television systems, although used only experimentally for information retrieval and dissemination, have many inherent advantages. The greater spectrum available to cable systems allows them to transmit many channels—older systems normally carry 12 channels and newer ones 35 channels (although systems capable of as many as 128 channels are currently being proposed in larger urban markets). Thus, the allocation of a large amount of spectrum space to data is possible. Further, because the channels are wideband, data can be transferred faster.

Finally, the wide bandwidth available through cable television systems provides for transmission of standard television photo images in 1/30 of a second (in addition to alphanumeric and graphic representations). However, in order for a subscriber to "hold pictures" each terminal device would have to be equipped with a "frame grabber" which would select the television photo image frames, store them in a local memory at the terminal location, and refresh them for the television screen. "Frame grabbers" currently have only been produced in small quantities and are very expensive.

Since all cable systems provide a one-way distribution to the home, teletext, which is a one-way system, can easily be adapted for cable systems without limiting use to lines in the vertical blanking interval. An entire television channel could be devoted to teletext. However, in order to store photo images, a frame grabber would be required at the subscriber location, in addition to the terminal equipment necessary for broadcast teletext (keypad, decoder, modulator).

Viewdata (interactive) applications are also possible with cable television systems. Two-way systems already allow for return data from subscriber locations. Older one-way systems will require the addition of amplifiers and filters, or retrofitting with a second cable.

Cable networks, linked via satellite, can provide a viewdata user with access to data banks at different locations, or with a central data bank located at the head end.

Cable television, which has already established the tradition of monthly subscriber charges for services, can market videotext as an add-on service, offering subscribers teletext, viewdata, or both, for a monthly service charge, or charging per page on computer interfaced two-way systems.

While the use of cable television solves some of the problems inherent in teletext or viewdata by providing greater spectrum and bandwidth, and is capable of transmitting photo images, there are still obstacles to mass use, including the cost of terminal equipment, the problem of privacy, and the design of existing systems.

Any market resistance to high subscriber terminal costs which would limit marketing of viewdata or teletext would also limit cable television. The advantage of cable television over viewdata (not counting the elimination of exorbitant telephone line costs) is the ability to display "photographic" images which could be transmitted at a rate of 30 per second. However, this advantage is immediately weakened or even dissipated by the prohibitive cost of installing a "frame grabber" with memory storage at each subscriber location. Mass marketing is inhibited or vitiated.

SUMMARY OF THE INVENTION

The principal object of the present invention is to adapt the latest cable television technology, as exemplified by the Nicholson patent, to the dissemination and retrieval of information. Using the present invention, individual subscribers are able to receive selected information from data banks through the same system which brings them television programming, and to receive it on their own, unmodified television sets. Accordingly, another object is to provide information to subscribers without the need for expensive terminal equipment at the subscribers' locations.

Another object of the present invention is to give subscribers quick access to information from a large data bank, a combination which is impossible under existing teletext systems. Another object is to maintain privacy in an information retrieval system by giving each subscriber a dedicated television channel; a collateral object is to maintain privacy in such a system without the need for each subscriber to have an information-dedicated telephone line.

An important object of the present invention is to allow subscribers to an information-delivery system to receive photographic information and not merely stylized graphics.

A cable television and information system in accordance with the present invention is capable of transmitting selected data to subscribers. In addition to the VHF television channels on which each subscriber receives regular programming, a UHF television channel is dedicated or assigned to each subscriber to deliver information. The use of an entire 6 MHz UHF channel for information guarantees that a great deal of information can be transmitted in a short time, thus satisfying the requirement for minimal retrieval time. The large bandwidth also allows photographic information to be delivered to subscribers' television sets. This cable television system includes a head end, trunk lines, bridger amplifiers, control stations, feeder lines and a central computer connected to the head end. The control stations include an information retrieval system for extracting information from the trunk lines and converting the frequencies carrying the information to the proper dedicated UHF frequencies. The cable television and information system also includes a subscriber station which includes a keyboard for selection of data to be displayed.

In the above cable television and information system, specialized equipment is concentrated at the control station, out of reach of the subscriber. Thus, the amount of specialized equipment required is only a fraction of what would be needed if each subscriber's home were so equipped, since one set of equipment in this system can serve many subscribers.

The subscriber generates data selection instructions identifying the desired data by typing the appropriate characters on the keyboard. Radio frequency signals corresponding to the keystrokes and to the station's identification number are transmitted along the feeder line to the control station, which demodulates and stores the signals. They also travel to the head end. At the head end, these data selection instructions are routed to the central computer, where they are decoded.

The central computer locates the selected data, either in its own internal data sources or in an external data source, if one is available to the system. The central computer then retrieves the data from the source, decodes it to a "scene" if it is teletext, formats it for display on a television set, and, if necessary, attaches an identifying number to the data. This number will be used by the control station to determine whether to extract the data from the trunk, which subscriber requested the information, and, therefore, at which dedicated UHF frequency to transmit it along the feeder cable. Finally, the central computer sends the selected data to the head end, where it is transmitted along the turnk line to the control station.

At the head end, data may be stored either in digital form, or, especially in the case of still slides, in analog form. The system has the option of transmitting the selected material along the trunk line to the control station in either digital or analog form. Digital transmissions can be made distortion-free, while analog transmission may be subject to some distortion. Digital transmission is slower (by about a factor of 10). A single television frame in digital form would require a transmission time of about ⅓ second whereas frames in analog form can be transmitted at a rate of 30 per second. In the preferred embodiment, however, all information is transmitted from the head end to the control station in analog form; consequently, if it is stored as digital data, it must be converted to analog by a digital-to-analog (D/A) converter. The head end uses the analog information to modulate a band of frequencies designated for downstream communication—the downstream channel—which is preferably within the VHF range.

At each control station, the identifying numbers corresponding to the data requests of subscribers connected to that particular control station are stored. The data selected by individual subscribers then is extracted from the trunk line by a frame grabber. Each subscriber's data or information, in the form of a television frame, is routed, in accordance with the identifying number, to one of several frame stores at the control station. The data frame is stored so that it can be continuously transmitted to the subscriber. The information is stored in digital form, converted to analog by a digital-to-analog (D/A) converter, and then used to modulate a unique carrier frequency corresponding to the particular subscriber's television set.

The modulated carrier frequency occupies a standard UHF television channel dedicated or assigned to a particular subscriber. All subscribers are assigned different UHF television channels for transmission of information. At the output of the control station, the carrier modulated with the selected data is inserted into the feeder line which serves the home of the subscriber who requested the data. VHF programming and information transmission on dedicated UHF channels occur on the same feeder lines. At the subscriber's terminal, a filter is connected to the subscriber's television set to block all channels except the channels bringing him programming or information. Only VHF programming channels and the dedicated or assigned UHF information channel reach the subscriber's set.

With this invention, the individually assigned subscriber channel can be received on a standard television set. Subscriber terminal costs are limited to a simple keypad and oscillator, since the bulk of the equipment necessary for information transmission is located at the common control station. When using a common feeder cable for both television programming and videotext, entry into the house can be made by using a single drop with a splitter at the rear of the television set.

An important advantage of this system in information retrieval is the assurance of privacy. Because each user has his own private dedicated channel, only the individual requesting information will be able to receive it. Unlike conventional cable television where the cable functions as a "party line," here each subscriber has his own private line.

This invention can use either the regular cable television feeder line or a separate feeder line. With a separate feeder line, the number of feeder lines from a single control station can be increased and the number of dedicated channels on each line can be increased by using the spectrum from 890 MHz down to 50 MHz for a total of 140 channels per feeder.

Another feature of this invention is the use of the concept of an inverted spectrum. As previously noted, cable television was forced to use increasingly high frequencies as additional programming services created a demand for more channels. This use of higher frequencies caused the associated problem of increased attenuation. The greater the distance these high frequency signals were transported, the greater the signal loss. To avoid this problem, the present invention assigns a 6 MHz channel to each subscriber on an inverted basis. Channel allocations consist of the UHF channels 14 through 83, using the spectrum 470 to 890 MHz. There are 70 channels available in this range so that on a single feeder cable, 70 different subscribers can each be allocated a channel. Using the inverted spectrum concept, the subscriber closest to the control station is assigned the highest channel—83 (884 to 890 MHz)—and the most distant subscriber the lowest—14 (470 to 476 MHz). This allows the highest frequency (subject to the greatest attenuation with distance) to be transported the shortest distance. Therefore, each subscriber receives a clear picture without the need for amplifiers along the feeder cable.

If subscriber density exceeds 70 homes per mile, then non-standard channel assignments are made in each cable television system on the unused portion of the spectrum until it overlaps the basic system, which will be at about 216 to 300 MHz in current cable systems. Also, as the UHF frequency falls below 470 MHz, a one-channel set-top converter will be required. Using this distribution pattern, the present invention can accommodate a virtually limitless number of program services since only the program selected by the subscriber need be transported along the feeder to the subscriber's private line.

Other objects and features of the present invention will be apparent from the following description taken in connection with the accompanying drawings.

DETAILED DESCRIPTION OF THE PREFERRED EMBODIMENT

Figure 1:
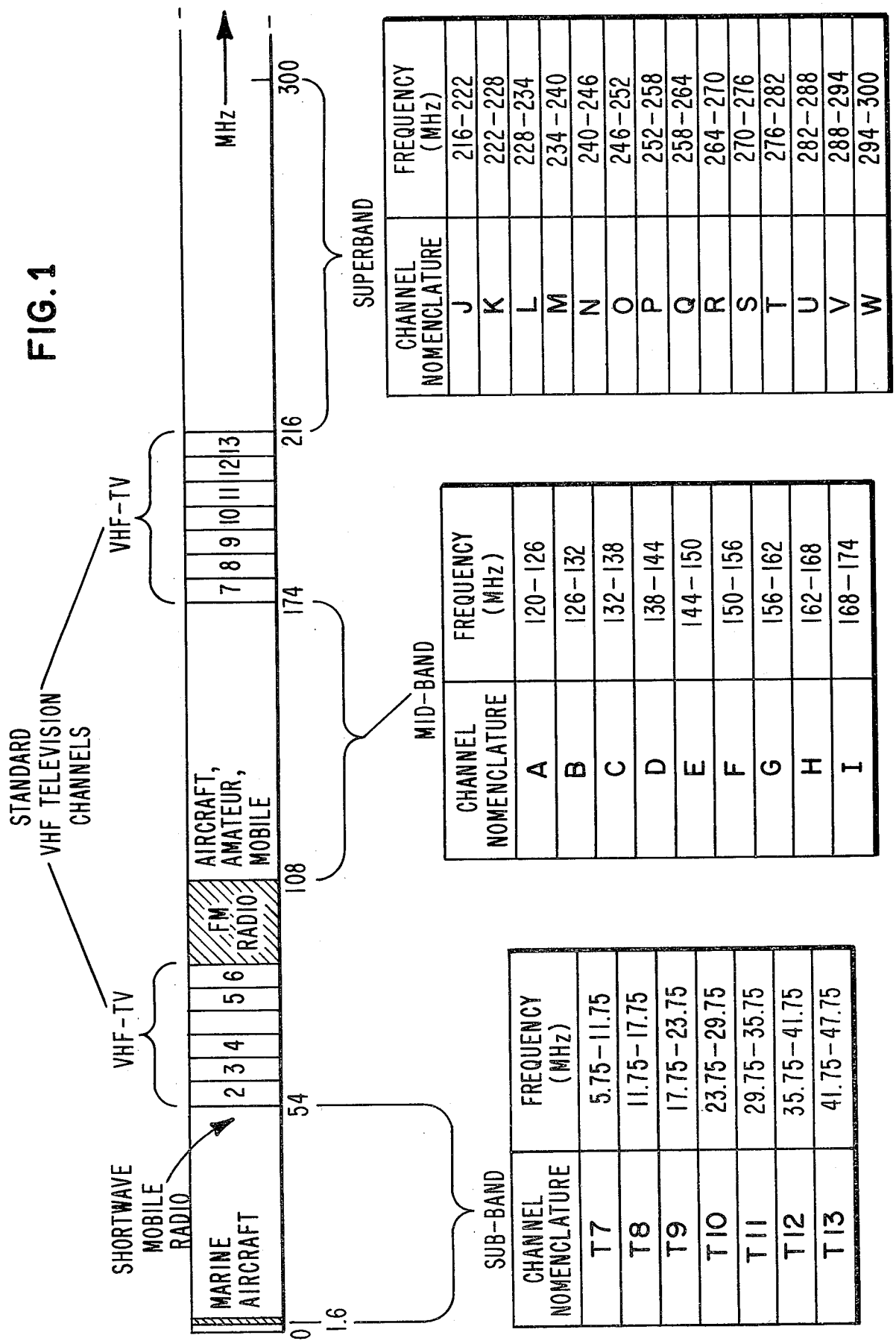
FIG. 1 shows the electromagnetic spectrum from 0 to 300 MHz, giving the allocations of several bands and nomenclature of several channels.

FIG. 1 shows the allocation of VHF broadcast television channels and other radio channels. A conventional cable television system delivering standard VHF channels and FM radio will transmit the band of frequencies from 54 to 108 MHz and the band 174 to 216 MHz to all subscribers. Subscribers can therefore receive VHF television and FM radio on unmodified receivers. A cable television system using a dedicated channel for each subscriber, such as described in the Nicholson patent, U.S. Pat. No. 4,077,006, as well as a system which transmits a greater number of programs than can be shown on the twelve standard VHF channels, will make use not only of these standard channels (2 through 13) but also of the midband and superband channels (A through W). Consequently, a cable system which does not give each subscriber a dedicated channel can televise 35 programs to an unlimited number of subscribers. On the other hand, the system described in the Nicholson patent can televise an unlimited number of programs to 35 subscribers on each feeder line.

Figure 2:
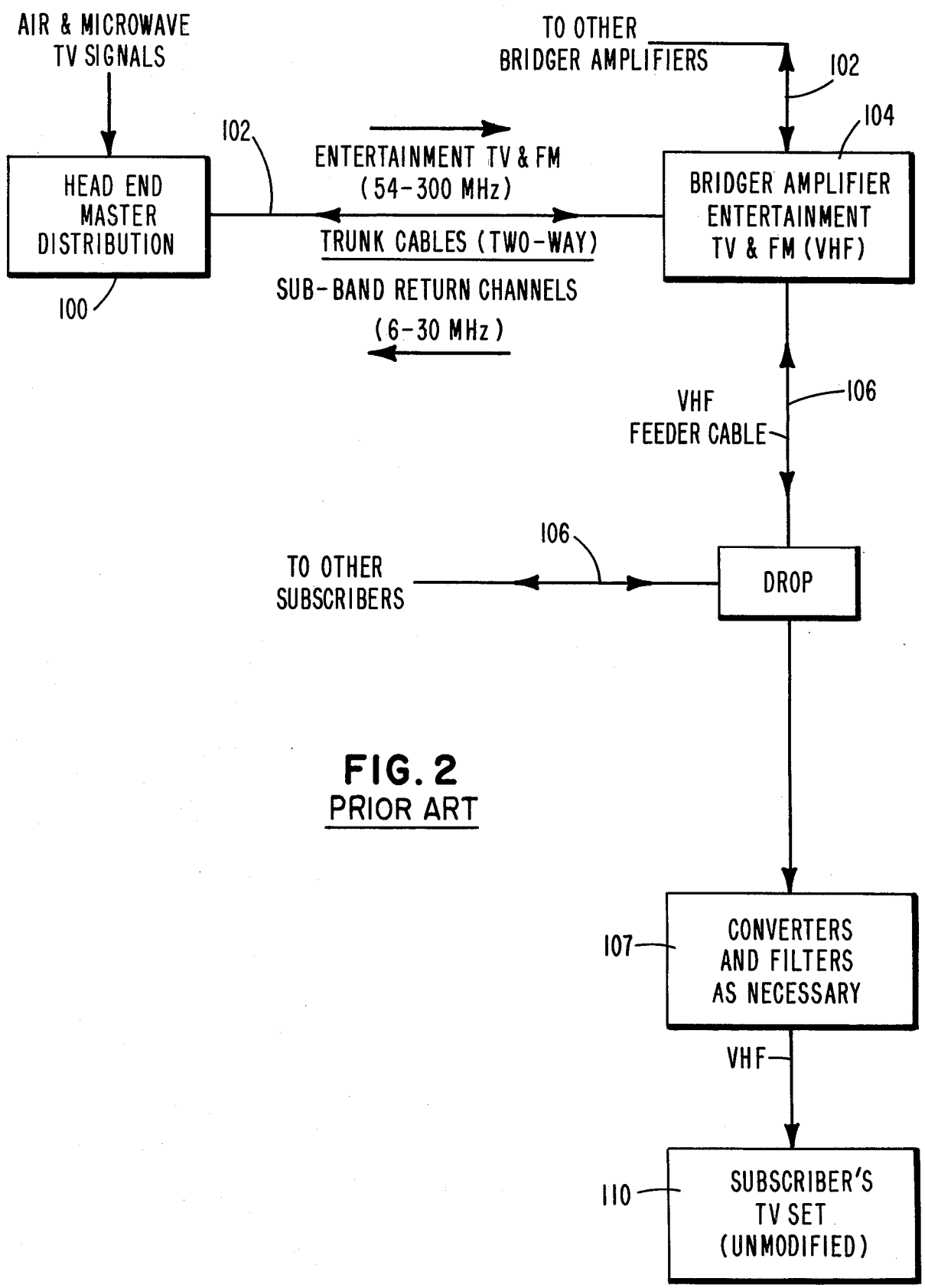
FIG. 2 is a block diagram of a prior art cable television system.

FIG. 2 illustrates a typical cable television system. At the head end 100, equipment is provided to receive incoming television programming by various means or to create locally-originated programs. After amplification and any other necessary signal processing, all channels are transmitted at their original frequencies, from 54 to 300 MHz, along the trunk line 102. Although only one trunk line is shown, there may be several, depending upon the particular system's design. Trunk lines 102 connect the head end 100 with all bridger amplifiers 104.

The bridger amplifier 104 is a conventional unit (for example, Station SP-2T-2W using two TF-30 high-low split filters, manufactured by Jerrold Electronics Corp. of Philadelphia, Pa.). It amplifies both upstream and downstream signals. The upstream signals, if any, will most often be requests by subscribers to view particular programming, although some systems may enable subscribers to send other signals to the head end.

The subscriber's television set 110 is attached to feeder line 106 through any necessary filters and converters 107. The set 110 is a standard television receiver able to receive VHF channels 2 through 13 and UHF channels 14 through 83. If programming is to be transmitted along feeder line 106 on other than these standard channels, a converter will be necessary.

Figure 3:
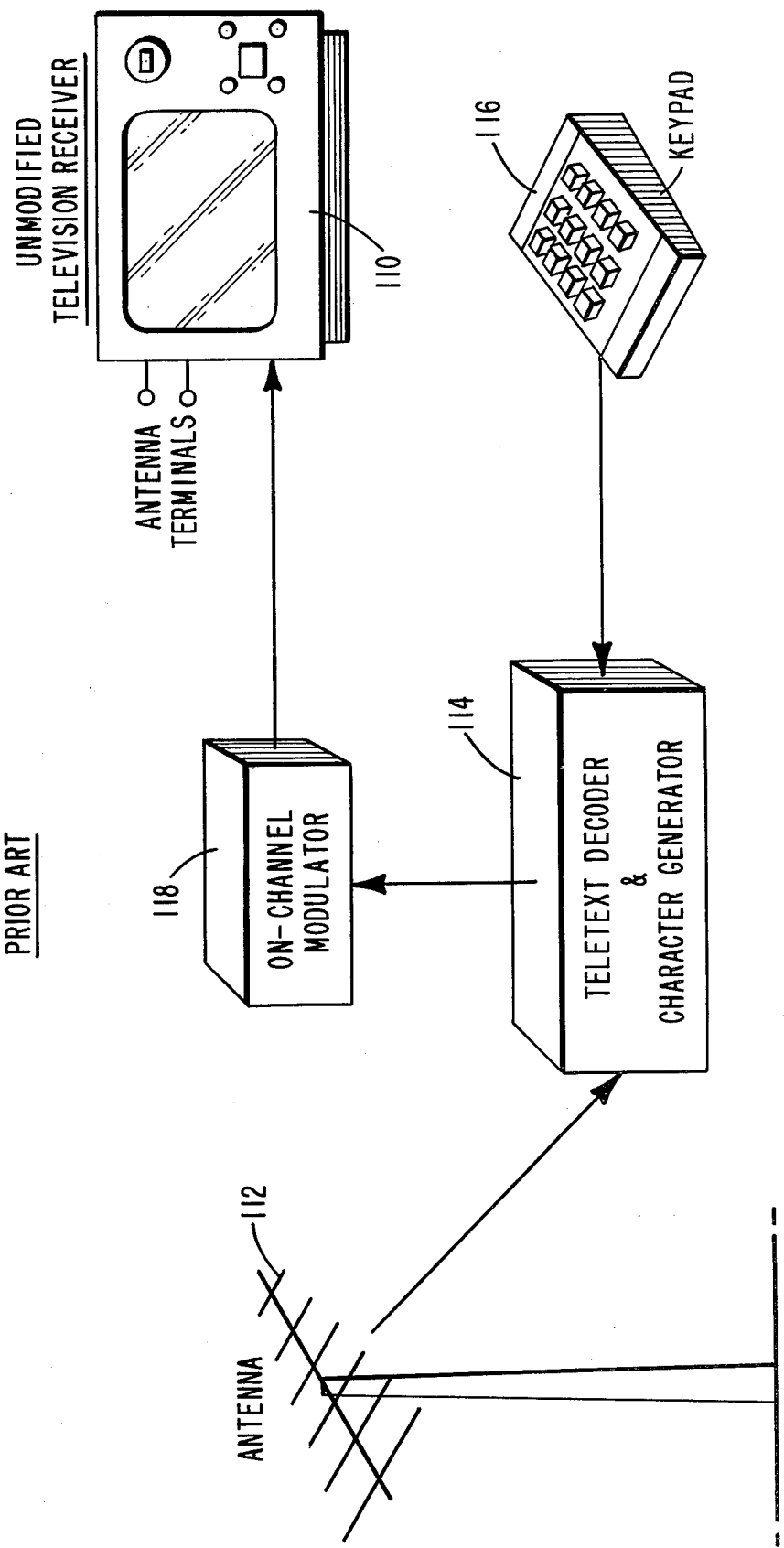
FIG. 3 is a block diagram of the subscriber terminal of a prior art videotext information system described above as teletext.

A subscriber terminal for a videotext information system called teletext is illustrated in FIG. 3. Data, as well as normal television programming, is received at the subscriber's antenna 112. Although an individual antenna can be provided for each subscriber, community antennas are equally useful with teletext. Television programming is delivered directly to the antenna terminals of the unmodified television set 110. Incoming signals are also sent to the decoder and character generator 114.

Because all available data is cycled continuously in a teletext system, in order to view a particular page of data on a television set, the subscriber need only key his request into his keypad 116. This request is processed by the decoder and character generator 114, which selects the requested page from the continuously-transmitted data, decodes it into characters for television display, and sends the characters to the on-channel modulator 118. There, the data is used to modulate the carrier frequency for the television channel on which the subscriber receives data. The data-modulated carrier is then input to the unmodified television set 110, where it is demodulated and the data viewed by the subscriber.

Figure 4:
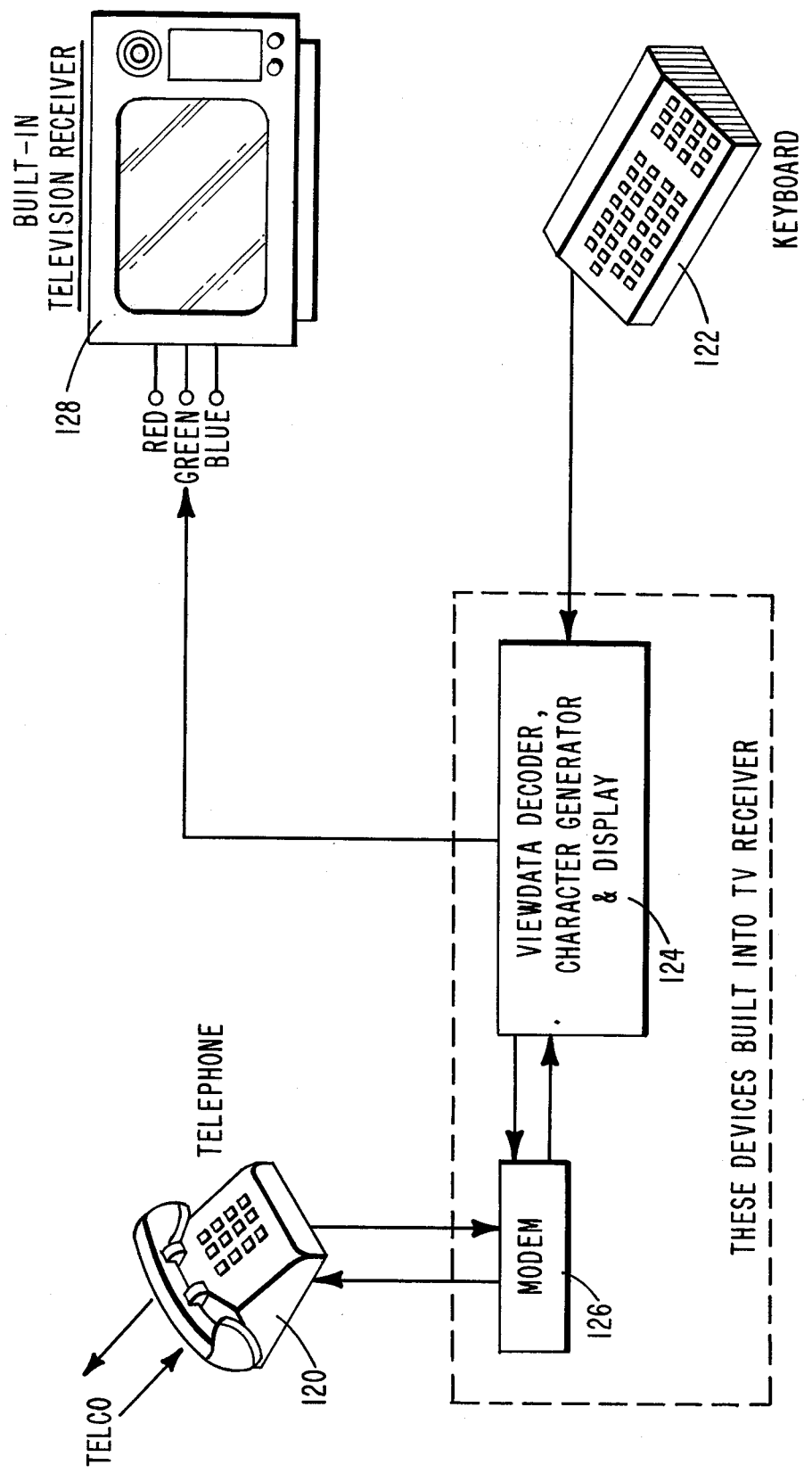
FIG. 4 is a block diagram of the subscriber terminal of a prior art videotext information system described above as viewdata.

FIG. 4 shows the subscriber terminal of another type of videotext system called viewdata. Subscribers to viewdata receive information through a dedicated telephone 120, which provides two-way communications with the data source. Requests for information are typed into a keyboard 122, encoded by the decoder and character generator 124, and modulated for telephone transmission by modem 126. Requests are then transmitted along telephone lines to the data source, where the requested information is retrieved and transmitted back to the subscriber. Modem 126 demodulates the incoming data, and decoder and character generator 124 decodes it into characters which are then displayed on the subscriber's television set 128. The viewdata television set 128 is a modified set, including the decoder and character generator 124 and the modem 126.

Figure 5:
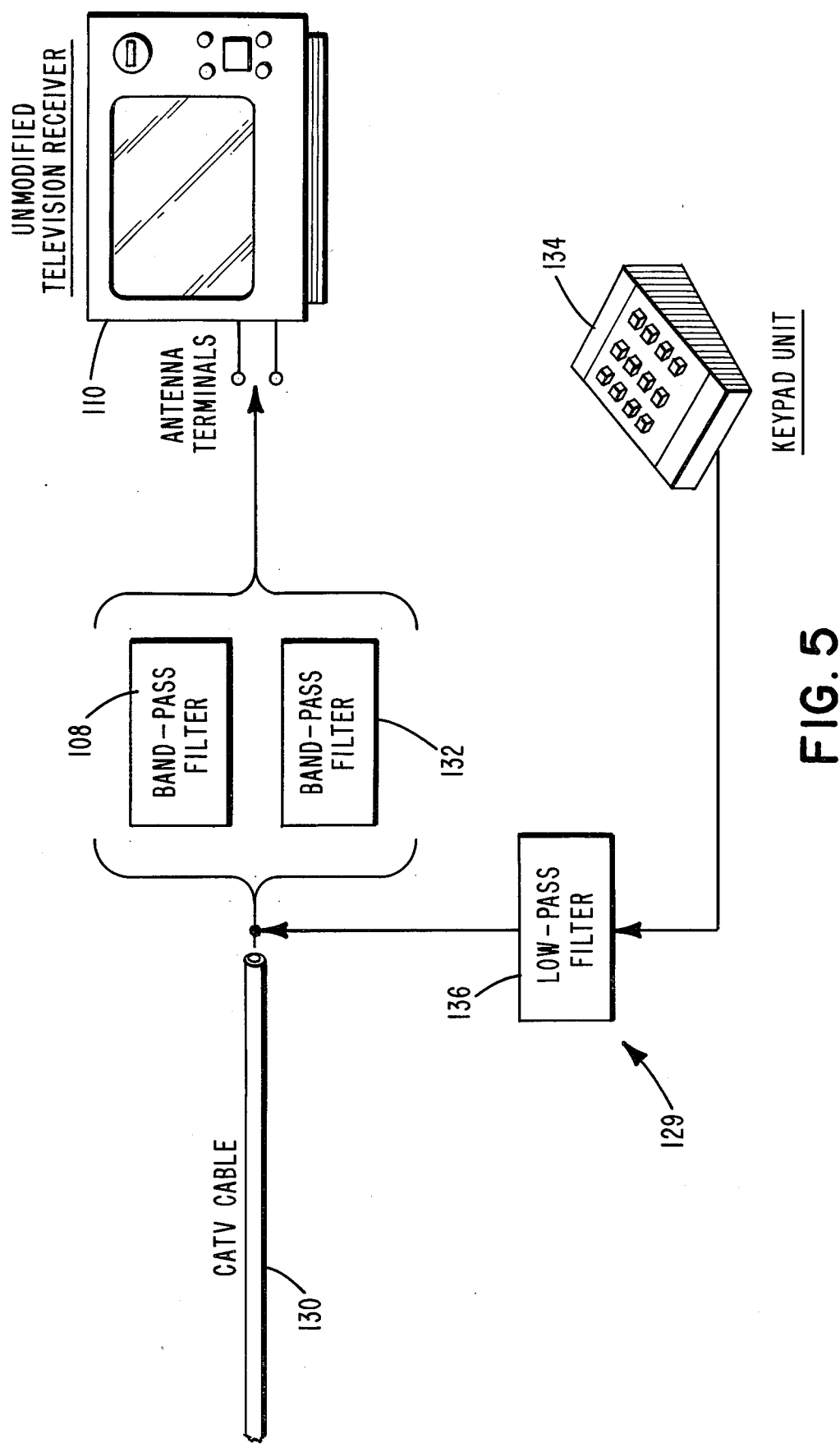
FIG. 5 is a block diagram of the subscriber terminal of the present invention.

The subscriber terminal of the present invention is shown in block diagram form in FIG. 5 and is generally identified by reference number 129. Coaxial cable 130 is a feeder line in a cable television system which carries television programming to the subscriber's unmodified television set 110. A bandpass filter 132 is interposed between cable 130 and television set 110 to block all frequencies except the subscriber's dedicated UHF information channel. For television program reception, a parallel VHF bandpass filter 108 would be included.

The subscriber wishing to view information first types an "all clear" signal into the keypad unit 134. Keypad unit 134 contains a small memory and an oscillator in addition to the keypad. If the keypad is, for example, the standard twelve-button numerical type, the all clear signal may be a single keystroke on one of the two non-numerical buttons. This signal clears the keypad's memory and prepares it to receive a new data request. Next, the subscriber keys in the catalogue number indicating which data is to be displayed on his television. (He may obtain this number, for example, from a printed catalogue distributed by the cable system operator; or the catalogue itself may be available electronically, by way of the information system of the present invention.) As the catalogue number is entered, it is stored in the memory. When the entire number has been stored, the subscriber types in a "transmit" signal (which, once again, may be one of the two non-numerical buttons on a twelve-button keypad), causing the data request, which is made up of the catalogue number, plus a station identification number which has been preset within the keypad, to be transmitted as a radio-frequency pulse train to the control station. Transmission of the pulse train is accomplished at the radio frequency of the keypad's oscillator, which operates on a return channel (a band of frequencies designated for upstream transmission) preferably within the range from 6 to 30 MHz. Many keypad oscillators may operate on the same return channel. A low-pass filter 136 at the output of keypad unit 134 ensures that only signals below 30 MHz are passed to the cable 130, thus preventing interference with television programming and data being transmitted along the cable.

Figure 6:
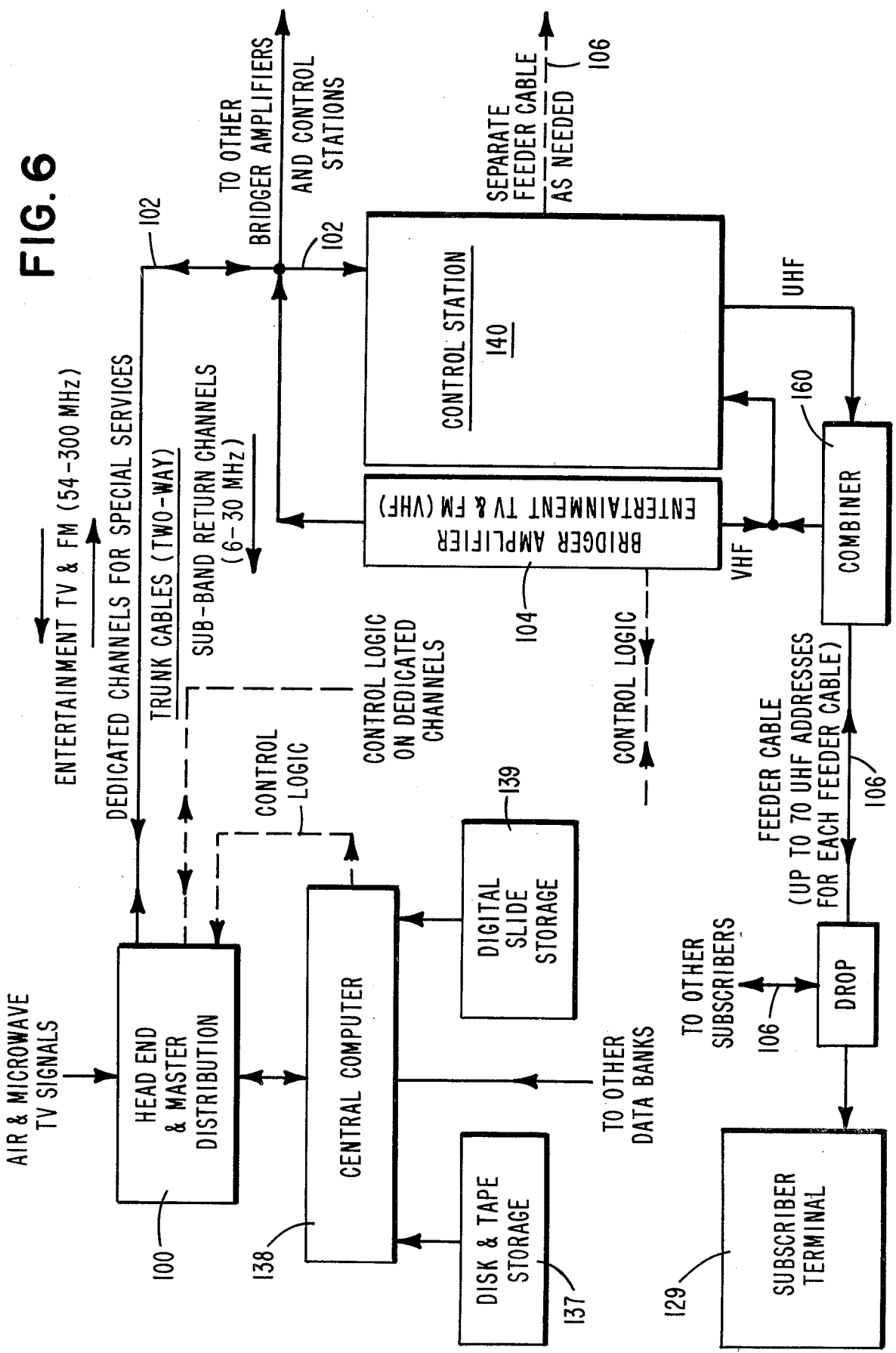
FIG. 6 is a block diagram of an entire information system in accordance with the present invention.

FIG. 6 shows the cable television system of FIG. 2 modified in accordance with the present invention to deliver selected data to subscribers over dedicated UHF television channels. A subscriber selects data to be viewed on his television set by generating data selection instructions as described above in connection with FIG. 5. The instructions are transmitted from subscriber terminal 129 along the feeder line 106 back to the bridger amplifier 104 and control station 140. The control station, whose operation will be described in greater detail below, demodulates the data request and stores both the station identification number and the catalogue number of the data. At the same time, the data request also passes through the bridger amplifier 104 which amplifies it and switches it onto trunk line 102 which carries it to the head end 100.

At the head end, central computer 138 demodulates and stores the data selection instructions. Computer 138 locates the selected data using its catalogue number by searching either the computer's own internal data sources, or external sources connected to the system. The catalogue number is used to refer to a directory which the computer 138 calls up from, for example, magnetic disc storage. Such indirect addressing allows more flexibility in the operation of the system. Internal data sources may be, for example, magnetic disc and tape 137, or still pictures in the form of slides 139. The data retrievable by this system may be stored in either analog or digital form. After locating and copying the selected data, central computer 138 decodes it, if it is stored as teletext (in digital form), to an analog (NTSC) "scene," and arranges it in the proper format for display on a television screen. If it is already stored in analog form, the decoding is unnecessary. Data stored in the computer's local sources will preferably be stored with the catalogue number already in the vertical blanking interval (VBI). If it is not there, the central computer 138 inserts the catalogue number into the VBI before transmission. Although in the preferred embodiment the VBI is used to carry the catalogue number, it will be appreciated that this number may be placed anywhere in the transmission. The selected data and its catalogue number are then sent to the head end 100 which transmits them the appropriate number of times along the trunk line 102 to the bridger amplifier 104 and control station 140. Although in the preferred embodiment the station identification number is not used by central computer 138 to control data flow, because the catalogue number is used by the control station 140 to determine which subscriber should receive the data, it is possible for computer 138 to make use of the station identification number in other ways. For example, it may be used by the computer to determine which control station 140 requested the data and thereupon to attach to the data an additional signal which will "alert" that control station to the fact that data is arriving for one of its subscribers. Also, whereas in the preferred embodiment all requested information is transmitted along all trunk lines, the station identification number may be used to select the proper trunk line for data transmission, thereby reducing unnecessary traffic on the other lines. Furthermore, if it is desired to charge subscribers for data requests, or if statistics of such requests are to be kept, the station identification number will be needed by central computer 138. Head end 100 need transmit a black-and-white frame only once. If it is transmitting a color frame, that need be transmitted only once if a frame grabber is used which will grab a single color frame. However, with the particular frame grabber used in this system, color frames must be transmitted three times because the presently available frame grabber grabs the three colors serially.

Figure 7:
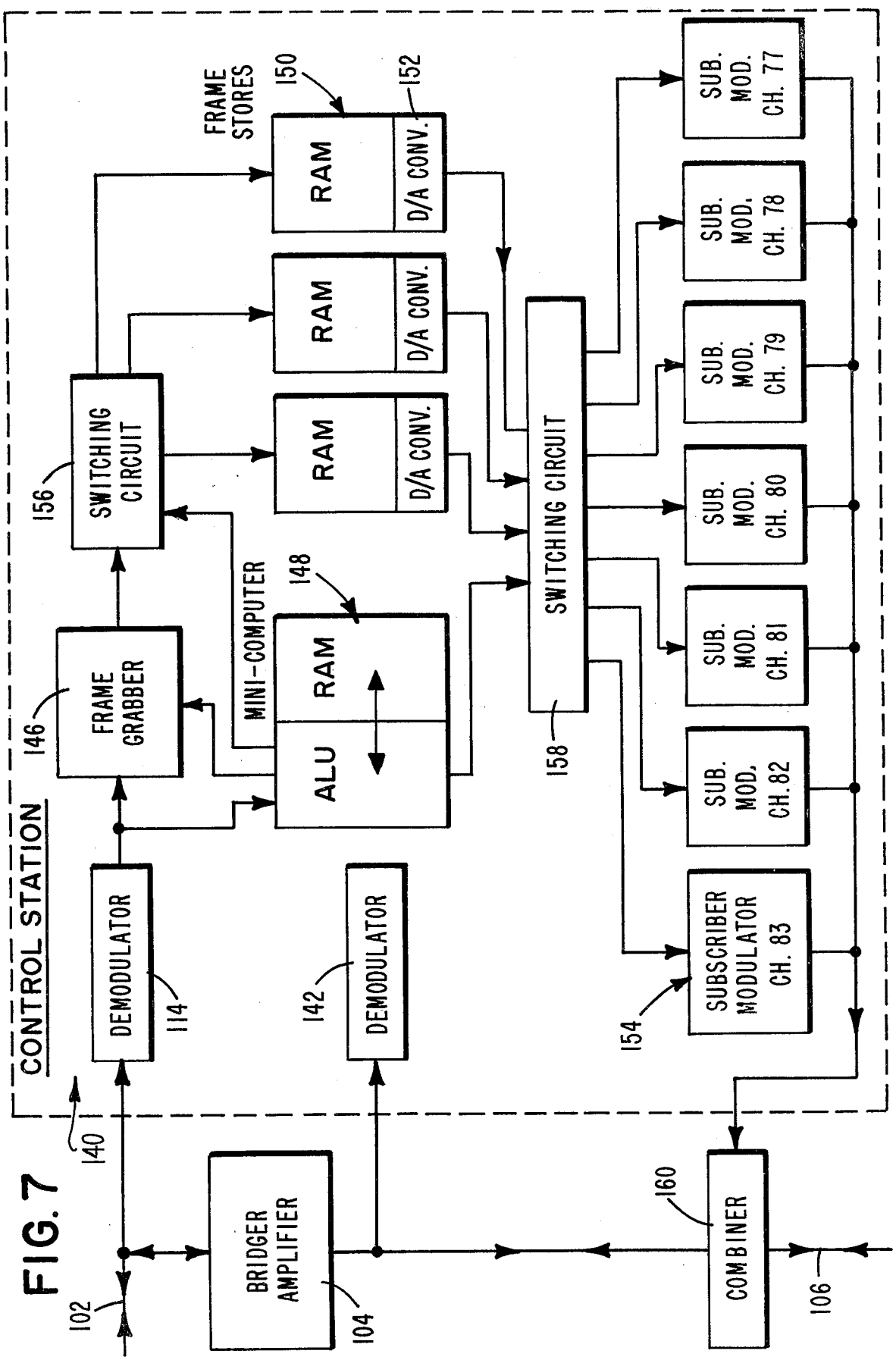
FIG. 7 is a detailed block diagram of the control station which is a part of the present invention.

Referring now to FIG. 7, a control station 140 is associated with each bridger amplifier 104 to direct selected data to the proper subscriber. Each control station 140 includes an upstream demodulator 142, a downstream demodulator 144, a frame grabber 146, a mini-computer 148, several frame stores 150 (each of which includes a digital-to-analog (D/A) converter 152), and a modulator 154 for each subscriber. Also part of the control station are two switching circuits controlled by the mini-computer, one switching circuit 156 determining which frame store receives the output of the frame grabber, and the other 158 determining to which modulator the output of the frame stores is sent. The number of frame stores 150 included in the control station 140 need not be as large as the number of modulators; only enough frame stores are needed to handle the peak volume of data requests.

Upstream demodulator 142, which is a conventional unit, receives and demodulates data requests from subscribers on a return channel within the range of 6 to 30 MHz. When the arithmetic and logic unit (ALU) of mini-computer 148 detects an output from demodulator 142, it stores it in the mini-computer's RAM. This information, it will be recalled, consists of a station identification number and a catalogue number. The catalogue number in the RAM will be compared by the mini-computer to the catalogue numbers in all of the VBI's of frames arriving on trunk line 102. If a match is found, the frame will be grabbed. The station identification number will be used by the mini-computer to direct the output of the appropriate frame store 150 to the proper subscriber's modulator 154, by controlling switching circuit 158.

All analog frames arriving at control station 140 from trunk line 102 on the VHF downstream channel are demodulated by downstream demodulator 144, also a conventional unit. From there, they are sent to both the mini-computer 148 and the frame grabber 146. In the absence of instruction from mini-computer 148, switching circuit 156 is open with respect to all frame stores 150, and the frame grabber 146 does not grab frames. Mini-computer 148 examines every VBI, comparing the catalogue numbers in the intervals to the catalogue numbers stored in its RAM. Whenever a match is found, the mini-computer 148 signals frame grabber 146 to retrieve the demodulated frame and at the same time operates switching circuit 156 so as to direct the frame with that catalogue number to one of the frame stores 150. Also at the same time, the mini-computer operates switching circuit 158, in accordance with the station identification number stored along the catalogue number, so as to direct the output of the same frame store to the modulator 154 corresponding to the subscriber who requested the data. The frame grabber is released to enable it to grab subsequent frames.

Because the frame stores 150 store frames in digital form in RAMs, whereas only analog information can be received on subscribers' television sets, a D/A converter 152 is a part of each frame store 150 and causes the digitally-stored frame to be converted to analog form before being output. In order to make the frames available to the frame stores 150 in digital form, frame grabber 146 includes an A/D converter at its input.

Analog data is then used by each modulator 154 to modulate a unique UHF carrier frequency associated with the television set of the subscriber who requested the data. The modulated carrier occupies a channel of frequencies adjacent the carrier frequency corresponding to the subscriber's dedicated UHF television channel.

The data, in the form of a modulated UHF carrier, then is sent to combiner 160 where it is combined with VHF signals which are also traveling downstream and placed on feeder line 106 for reception by the requesting subscriber.

The frame grabber 146 is a commercially-available device manufactured by Matrox Electronic Systems, Ltd., Montreal, Que. It is capable of grabbing a color frame and outputting it in real time, although it stores the three colors serially and separately. The Matrox Frame grabber includes the necessary A/D converter, logic, and memory to perform its functions. Switching circuits 156 and 158 may be, for example, conventional crossbar switching arrangements using pen diodes as the individual switches. The control station's mini-computer, although not itself a conventional unit, is built in a conventional manner from standard logic and memory cards.

At each subscriber location, as shown in FIG. 5, one or more bandpass filters are connected between the feeder line 106 and the television set 110. If television programming is to be received on a dedicated VHF channel, a VHF bandpass filter 108 is included. To receive selected data on a dedicated UHF channel, the subscriber will require a UHF bandpass filter 132. These UHF bandpass filters block all frequencies except the UHF channel assigned or dedicated to the particular subscriber.

Subscribers to the cable television information system of the present invention are able to receive selected data on a standard, unmodified television set 110, as long as the set is able to receive UHF channels 14 through 83 (470 to 890 MHz). In order to receive information which has already been requested and is being transmitted along the feeder line, the subscriber must tune his television set to his dedicated UHF channel. If it is tuned to any other UHF channel, bandpass filter 132 will block any signals which may be arriving on that channel, and the television set will receive nothing. Only when the subscriber's television set 110 is tuned to his dedicated UHF information channel will selected data be received.

Figure 8:
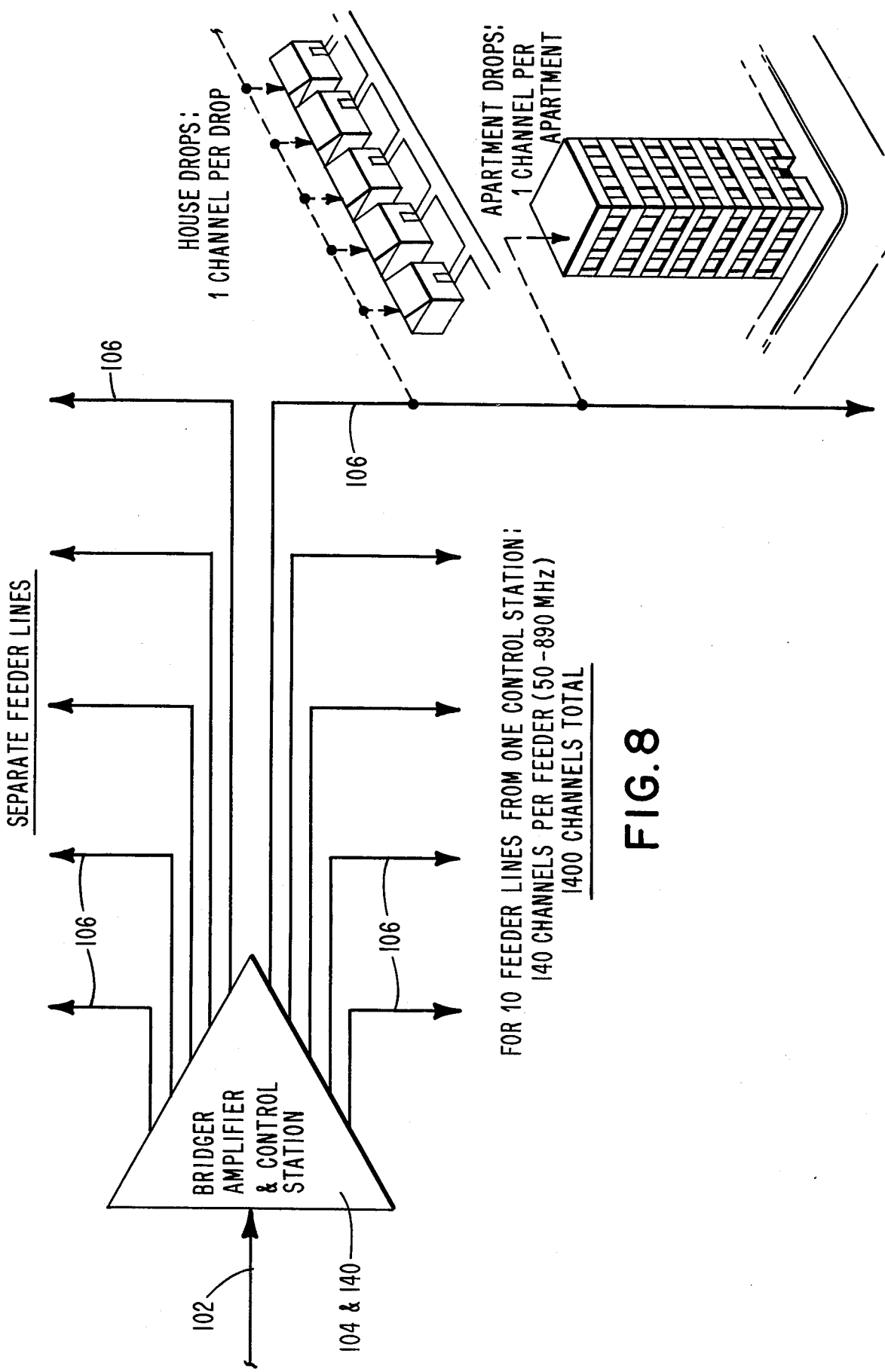
FIG. 8 illustrates one embodiment of a feeder cable system in accordance with the present invention.

If the number of subscribers on a given feeder line exceeds 70, the number of standard UHF channels, more subscribers can be added to the same feeder line by using non-standard UHF channels and even extending the spectrum into the VHF range. In FIG. 8, for example, an embodiment of this invention is shown in which 1400 subscribers are served by a single bridger amplifier and control station. If all of the frequencies from 50 through 890 MHz are allocated to dedicated information channels, 140 6-MHz channels are available for assignment to subscribers. Using ten feeder lines and connecting 140 subscribers to each, 1400 subscribers can be served. It should be emphasized, however, that television programming could not be received on standard VHF channels in this embodiment without the use of separate feeder lines for programming. Here, all channels from 50 to 890 MHz are dedicated to information; the standard VHF television channels fall within this range (see FIG. 1) and therefore would be used for data reception rather than programming. Separate feeder lines 106 must be used for television programming.

Figure 9:
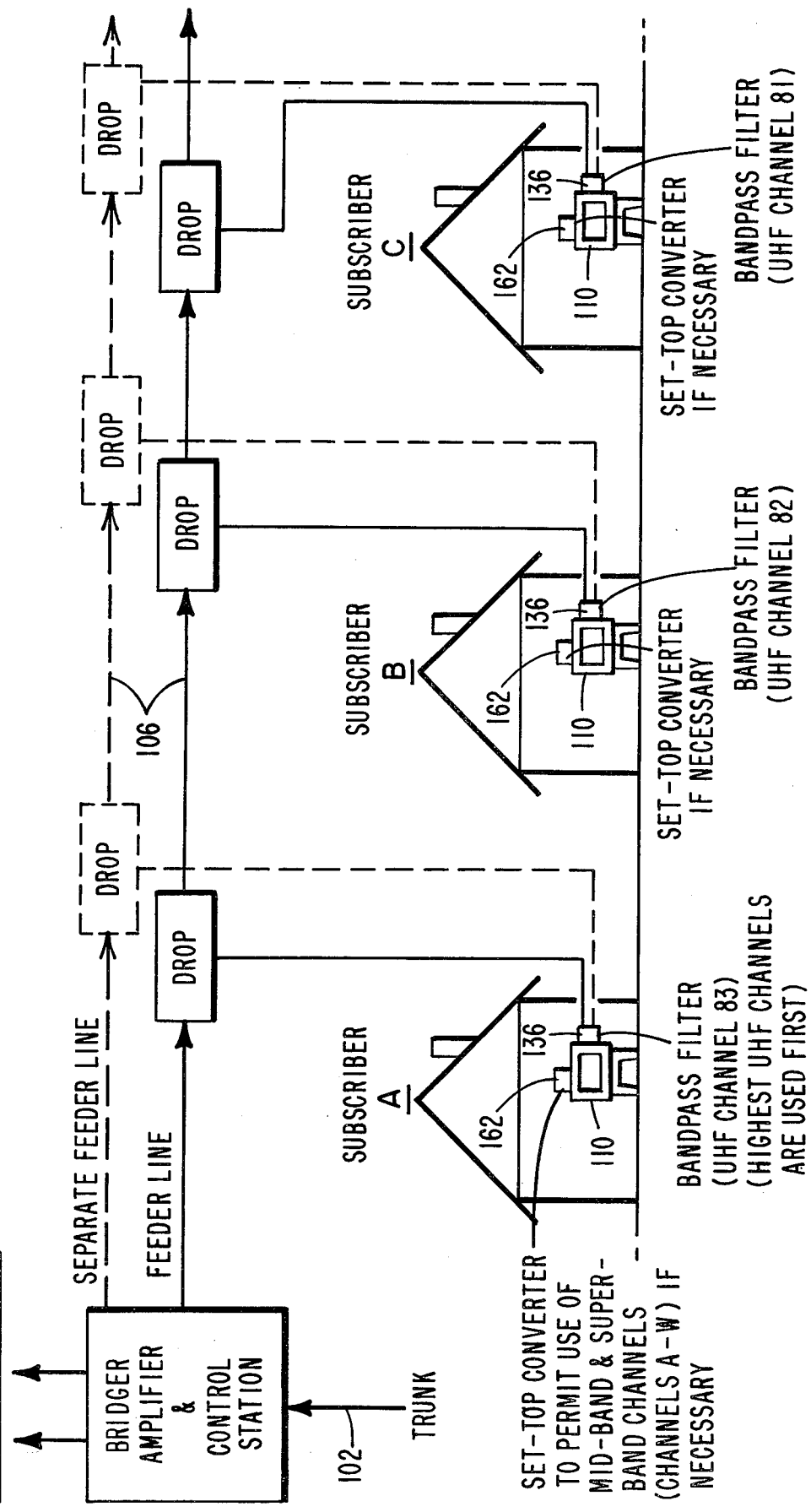
FIG. 9 shows details of subscriber drops in the system of the present invention.

FIG. 9 shows the choice between using one or two feeder lines 106—one of the feeder lines is shown as a dashed line and the other as a solid line. In systems using a single feeder line 106 for both data and television programming ("same feeder" systems), the dashed feeder line would not be present. Both feeder lines would be present in systems using separate feeder lines 106 for data and programming ("separate feeder" systems).

FIG. 9 also illustrates the inverted spectrum feature of this invention. Bandpass filter 136, which is connected between the feeder line 106 and the television set 110 belonging to subscriber A, is tuned to UHF channel 83, the highest-frequency UHF channel, because subscriber A is located closer to the bridger amplifier and control station than any other subscriber. Because higher frequency signals attenuate to a much greater degree with distance along the feeder line than lower frequency signals, channels of descending frequency are allocated to subscribers of increasing distance from the bridger amplifier and control station. Since subscriber B is more distant than subscriber A from the bridger amplifier and control station, it is assigned a lower frequency UHF channel, channel 82. Subscriber C, further still, has UHF channel 81. A similar allocation of channels is made for the remainder of the subscribers connected in feeder line 106.

Set-top converters 163, which are also shown in FIG. 8, are used whenever the subscriber's dedicated information channel (or television programming channel) is not one of the standard VHF or UHF television channels 2 through 83. In that case, an unmodified television set 110 is unable to receive the dedicated channel unless it is converted to one of the standard channels. Each subscriber's converter 162 need only convert one channel—his dedicated channel—to a standard television channel (two converters would be required, of course, if both the subscriber's dedicated information channel and his dedicated programming channel were non-standard).

Figure 10:
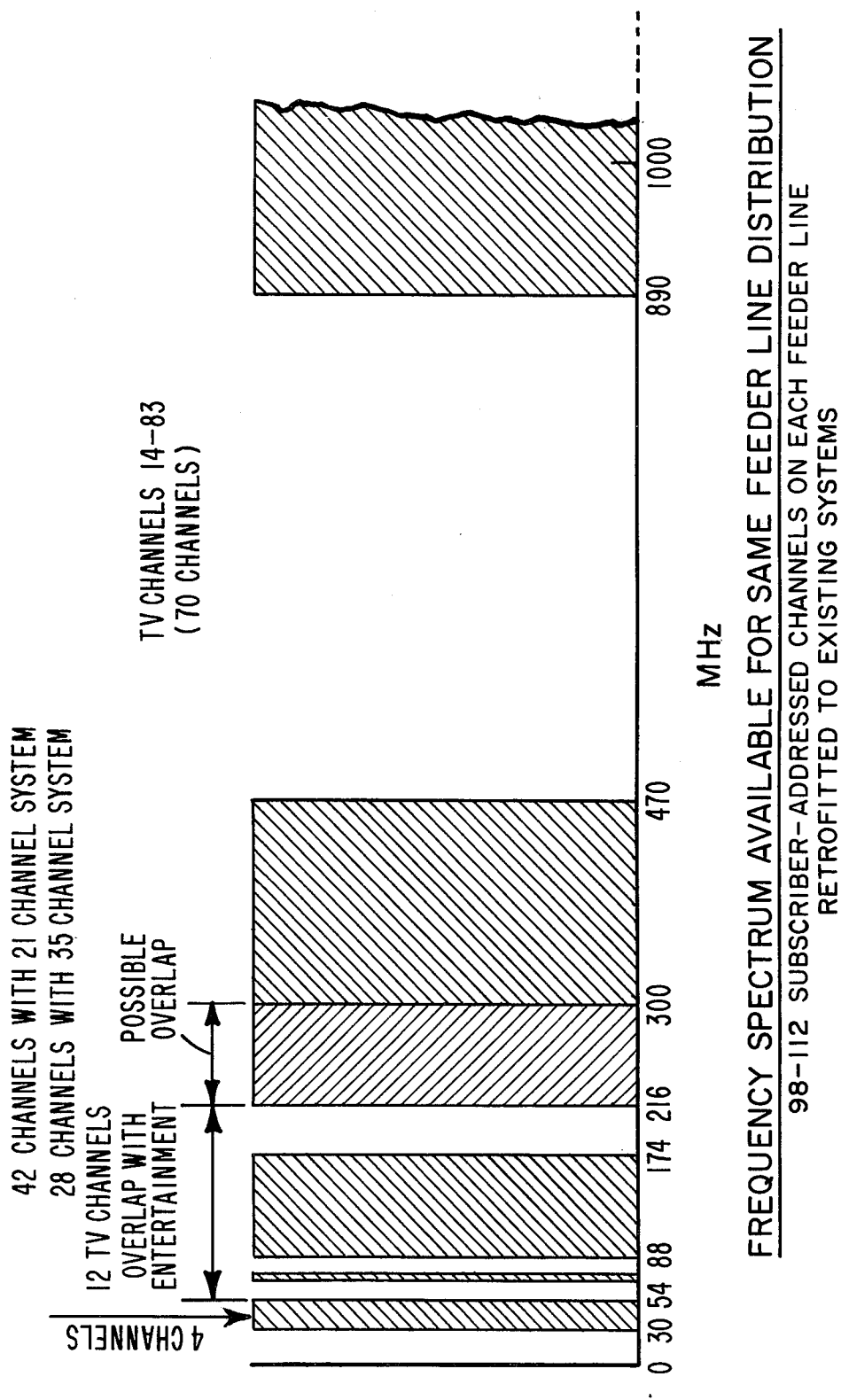
FIGS. 10 and 11 are diagrams of the electromagnetic spectrum from 0 to 890 MHz, showing channels available for use with the present invention.
Figure 11:
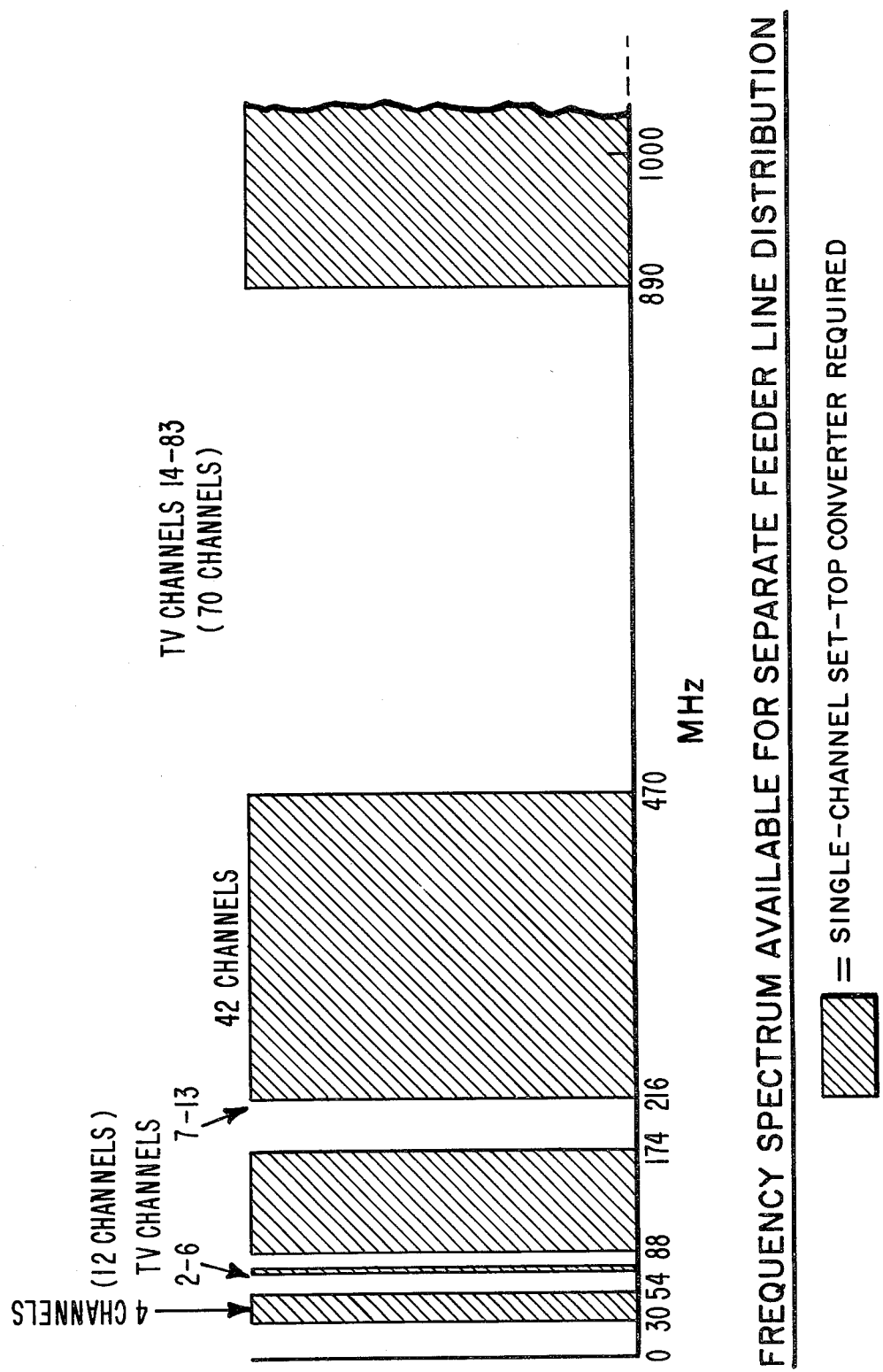

In FIGS. 10 and 11, the number of available channels in the same feeder system of FIG. 9 is compared to the number of available channels in the separate feeder system by showing the allocation of the electromagnetic spectrum. In both figures, shaded areas are those channels for which a set-top converter 162 is required. In FIG. 10, the cross-hatched area (labelled "possible overlap") indicates channels which may or may not already be dedicated to television programming in the particular cable television system under consideration. If dedicated to programming, they are unavailable for data transmission. There are 42 possible channels between 216 and 470 MHz. In a 21-channel cable television system, none of these are for programming, so all 42 could be dedicated to data. A 35-channel cable television system adds 14 programming channels to the 21-channel system by using the VHF frequencies from 216 to 300 MHz. In such a system, only 28 information channels would be available below 470 MHz. The area labelled "overlap with entertainment" indicates channels which normally would be used for programming in any given cable television system. There is no possible overlap with entertainment in separate feeder systems (as shown in FIG. 11).

Figure 12:
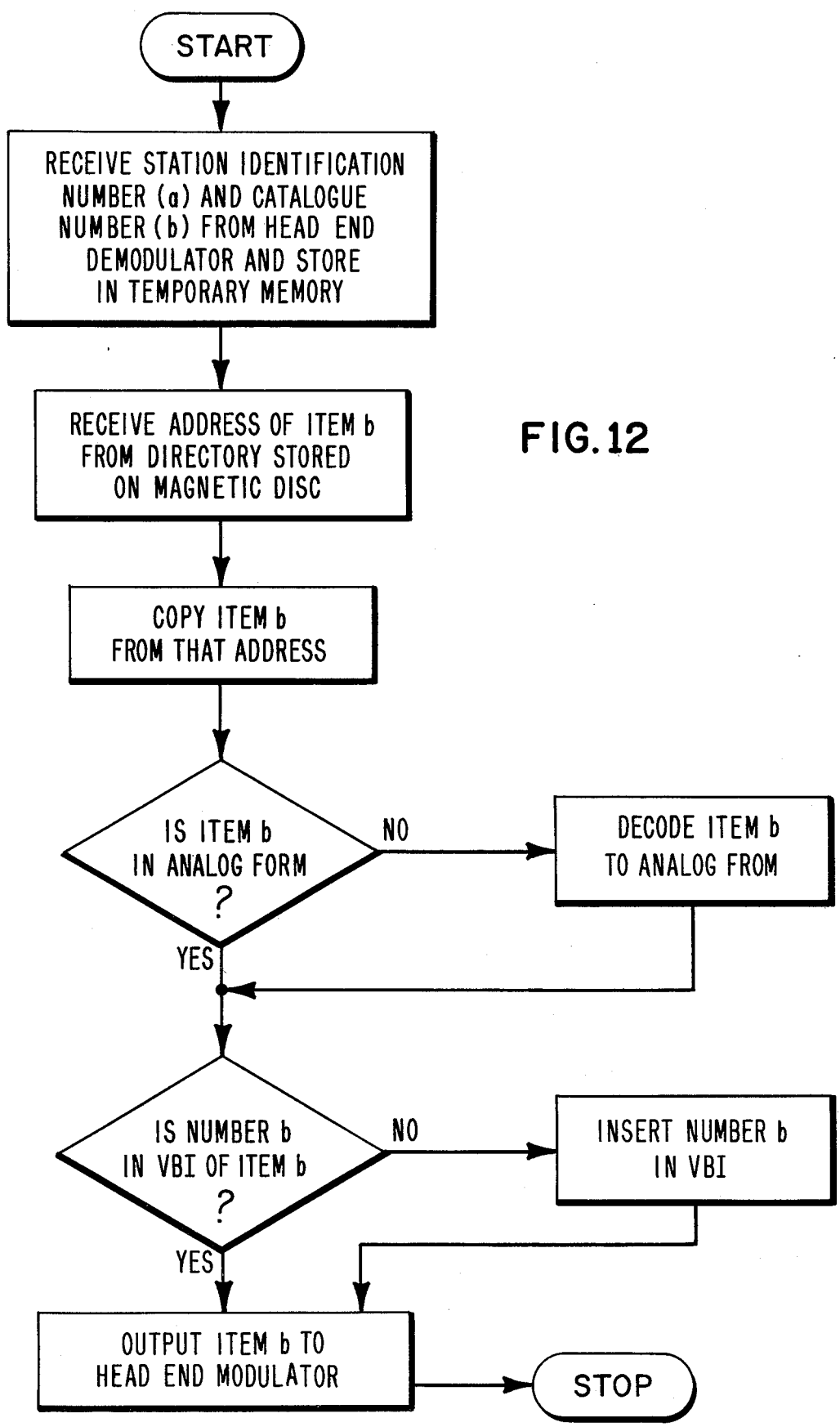
FIG. 12 is a flow diagram for the computer program of the central computer used with this invention.
Figure 13:
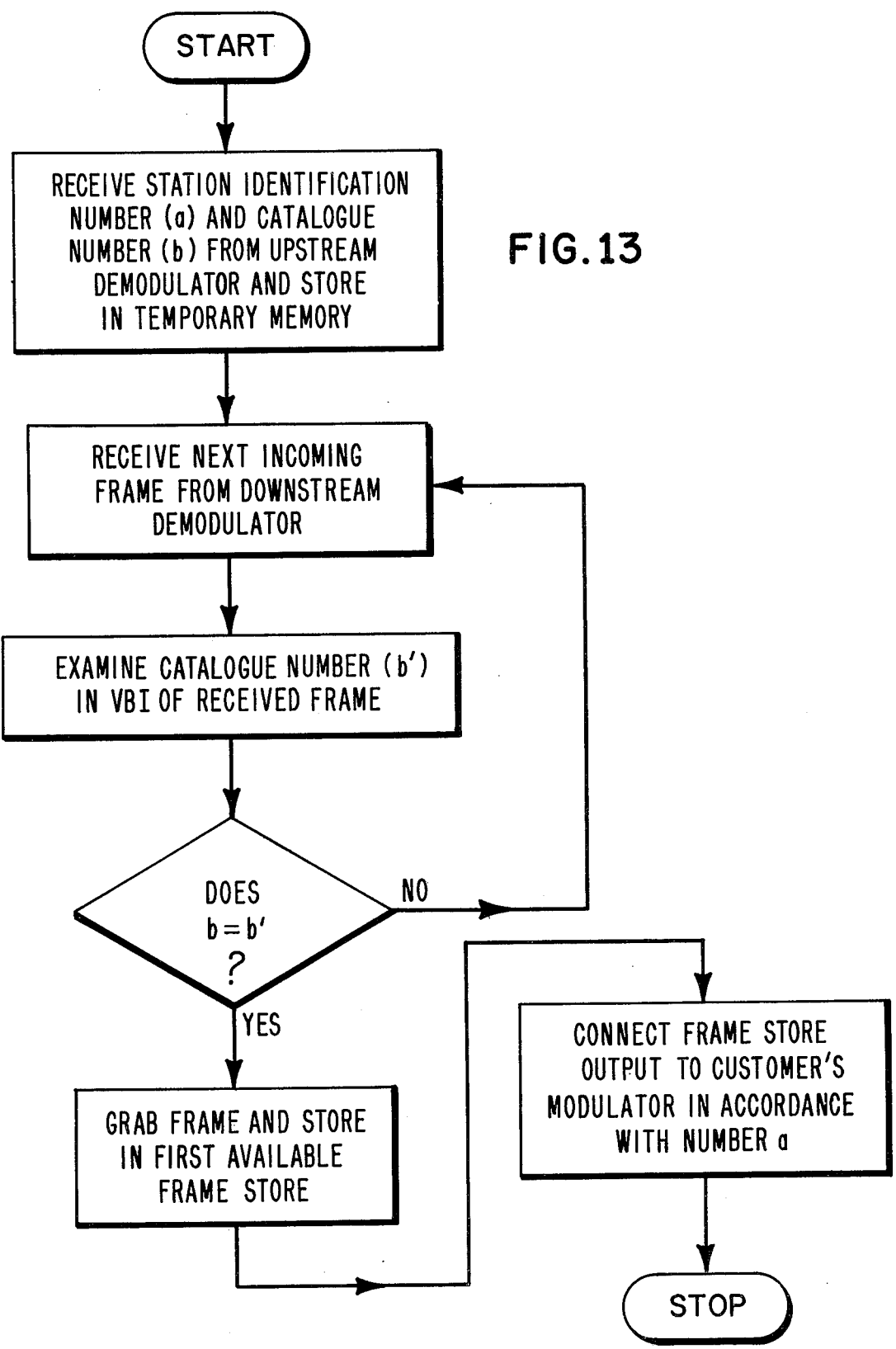
FIG. 13 is a flow diagram for the computer program of the minicomputer used in the control station of this invention.

FIGS. 12 and 13 illustrate the program steps performed by central computer 138 and mini-computer 148, respectively, during the operation of the invention.

Although illustrative embodiments of the present invention have been described in detail with reference to the accompanying drawings, it is to be understood that the invention is not limited to those precise embodiments and that various changes or modifications may be effected therein by one skilled in the art without departing from the scope or spirit of the invention. For example, the highest frequency used for dedicated subscriber channels should not be considered as limited to UHF channel 83 (884 to 890 MHz) but may be as high as the state of the art will show.

I claim:

1. A cable television information system for transmitting video picture information to television receivers at subscriber terminals on a cable distribution system, said cable distribution system including a head end, at least one trunk line connected to said head end, at least one bridger amplifier connected to said trunk line and at least one feeder cable connected between said bridger amplifier and said subscriber terminals, said cable television information system comprising:
   information storage means for storing video picture information;
   information retrieval means coupled to said head end and said information storage means for retrieving video picture information from said information storage means and supplying the video picture information to said head end for transmission on said trunk lines of said cable distribution system;
   control means associated with at least one of said bridger amplifiers and at least one of said feeder lines for capturing and storing the video picture information on said trunk line, said control means including transmission means for transmitting the video picture information to one of said subscriber terminals on a television channel dedicated to said one subscriber terminal.

2. The cable television information system of claim 1 wherein the video picture information comprises standard television photo images.

3. The cable television information system of claim 1 wherein the video picture information comprises still pictures.

4. The cable television information system of claims 2 or 3 wherein said transmission means of said control means transmits the video picture information to said one subscriber terminal at a rate greater than or equal to 30 times per second.

5. The cable television information system of claim 1 wherein said control means comprises a frame grabber coupled to said bridger amplifier for capturing a video frame of the video picture information and a frame store coupled to said frame grabber for storing the video frame in a storage location assigned to said one subscriber terminal.

6. The cable television information system of claim 5 wherein said transmission means comprises a plurality of television channel modulators coupled to said frame store, said television channel modulators being assigned to transmit different dedicated television channels to each one of said subscriber terminals connected in the feeder line associated with said control means, said television channel modulators further transmitting the video picture information to one of said subscriber terminals on one of the dedicated television channels.

7. The cable television information system of claim 6 wherein said transmission means further comprises a D/A converter coupled between said frame store and said television channel modulators.

8. The cable television information system of claim 6 wherein said television channel modulators are UHF modulators, the dedicated television channels being UHF channels.

9. The cable television information system of claim 6 wherein said television channel modulators are both UHF and VHF modulators, the dedicated television channels being both UHF and VHF channels.

10. The cable television information system of claims 6, 8 or 9 wherein the dedicated television channels are assigned to said subscriber terminals in a descending order depending on the distance of said subscriber terminal from said control means.

11. The cable television information system of claims 6 or 8 wherein the same feeder line transmits both the dedicated television channels and standard television broadcast channels to said subscriber terminals.

12. The cable television information system of claims 6 or 9 wherein a first feeder line transmits the dedicated television channels to said subscriber terminals and a second feeder line transmits standard television broadcast channels to said subscriber terminals.

13. The cable television information system of claim 8 wherein the UHF channels are 6 MHz channels in the UHF frequency spectrum of 470 HMz to 890 MHz.

14. The cable television information system of claim 9 wherein the dedicated television channels are 6 MHz channels in the frequency spectrum of 50 MHz to 890 MHz.

15. The cable television information system of claim 5 wherein said frame store has a plurality of storage locations, one of said storage locations being assigned to each one of said subscriber terminals connected to said feeder line associated with said control means.

16. The cable television information system of claims 1 or 6 wherein each of said subscriber terminals comprises a television receiver and channel receiving means coupled to said television receiver for passing the television channel dedicated to said subscriber terminal and blocking all other television channels dedicated to other subscriber terminals.

17. The cable television information system of claim 16 wherein said channel receiving means comprises a bandpass filter for passing the dedicated television channel.

18. The cable television information system of claim 17 wherein said channel receiving means further comprises a filter for passing standard television broadcast channels.

19. The cable television information system of claim 1 wherein said one subscriber terminal comprises request means operable by the subscriber for requesting video picture information selected by the subscriber, said request means generating selection instructions which are transmitted over said cable distribution system to said information retrieval means.

20. The cable television information system of claim 19 wherein said request means comprises a keypad operable by the subscriber to select particular video picture information and signalling means coupled to said keypad for generating the selection instructions in response to operation of said keypad.

21. The cable television information system of claim 20 wherein said signalling means comprises oscillator means for transmitting a signal in the frequency range of 6–30 MHz.

22. The cable television information system of claim 19 wherein the selection instructions include a station identification number identifying said one subscriber terminal.

23. The cable television information system of claims 19 or 22 wherein said information retrieval means is responsive to the selection instructions for retrieving the selected video picture information.

24. The cable television information system of claim 23 wherein said information retrieval means further generates address information identifying the selected video picture information and transmits the address information and video picture information to said control means via said head end and trunk lines of said cable distribution system.

25. The cable television information system of claim 24 wherein said control means further includes decoding means coupled to said transmission means for decoding the address information to enable said transmission means to transmit the video picture information on the dedicated television channel assigned to said subscriber terminal requesting the selected video picture information.

26. The cable television information system of claim 25 wherein said information retrieval means is a central computer.

27. The cable television information system of claim 1 wherein said one subscriber terminal comprises request means for generating a request for specified video picture information and transmitting the request on said cable distribution system to said information retrieval means, said information retrieval means being responsive to the request for retrieving the specified video picture information.

28. The cable television information system of claim 27 wherein said request means further generates address information identifying said one subscriber terminal and said information control means is responsive to the address to enable said transmission means to transmit the specified video picture information to said one subscriber terminal requesting the specified video picture information.

29. The cable television information system of claim 28 wherein said information retrieval means is a central computer.

30. The cable television information system of claim 1 wherein said information storage means comprises a digital side storage device.

31. The cable television information system of claim 1 wherein said information storage means comprises an analog storage device.

32. A cable television information system for transmitting information to television receivers at subscriber terminals on a cable distribution system including a head end, trunk lines connected to said head end, bridger amplifiers connected to said trunk lines and feeder cables connected between said bridger amplifiers and said subscriber terminals, said cable television information system comprising:

information storage means for storing information;

information retrieval means coupled to said head end and said information storage means for retrieving specified information from said information storage means upon request by one of said subscriber terminals, said one subscriber terminal including request means for requesting the specified information and transmitting a request to said information retrieval means over said cable distribution system, said information retrieval means supplying the specified information to said head end for transmission on said trunk lines of said cable distribution system;

control means coupled to said trunk lines at a location corresponding to the location of the bridger amplifier and feeder cable associated with said one subscriber terminal for capturing the specified information, said control means including storage means for storing the specified information and transmission means connected to said storage means for repetitively transmitting the specified information stored in said storage means to said one subscriber terminal on a television channel dedicated to said one subscriber terminal.

33. In a cable distribution system including a head end, trunk lines connected to said head end, bridger amplifiers connected to said trunk lines, feeder cables connected to said bridger amplifiers and subscriber terminals connected to said feeder cables, a cable television information system for transmitting video picture information to television receivers at said subscriber terminals, said cable television information system comprising:

information storage means for storing video picture information;

information retrieval means coupled to said head end and said information storage means for retrieving video picture information from said information storage means upon request by one of said subscriber terminals and supplying the video picture information to said head end for transmission on said trunk lines of said cable distribution system;

control means coupled to said trunk lines at a location corresponding to the location of the bridger amplifier connected to the feeder line connected to said one subscriber terminal for capturing the video picture information, said control means including storage means for storing the video picture information and transmission means coupled to said storage means for repetitively transmitting the video picture information stored in said storage means to said one subscriber terminal on a television channel dedicated to said one subscriber terminal.

34. In a cable television system containing a plurality of television receivers connected to a transmission line for transmitting television signals including programming to the receivers, wherein selected data is transmitted on the transmission line along with the programming, an information system for displaying the selected data on a selected one of the television receivers, comprising:
   data extraction means connected to the transmission line for extracting the selected data therefrom;
   switching means connected to said data extraction means for routing the selected data in accordance with the identity of the selected one of the television receivers on which the data is to be displayed;
   storage means connected to said switching means for storing the selected data; and
   a plurality of modulators, each of said modulators being connected between said storage means and the transmission line and operating at a unique carrier frequency associated with a particular television receiver, to modulate the carrier frequencies with the data stored in said storage means.

35. A method for transmitting video picture information to a selected one of a plurality of television receivers on a cable distribution system which includes a feeder line connected to the television receivers and a frame store, said method comprising the steps of:
   storing the information in the frame store;
   modulating a carrier frequency with the stored information, said carrier frequency being associated with the selected television receiver;
   transmitting the modulated carrier frequency along the feeder line; and
   tuning the selected television receiver to the carrier frequency.

36. A method for transmitting video picture information to a requesting subscriber's terminal on a cable distribution system which includes a head end, a trunk line connected to the head end, a plurality of frame stores connected to the trunk line, a feeder line connected to the plurality of frame stores, and a plurality of subscriber terminals connected to the feeder line, said method comprising the steps of:
   generating a request for the information at the requesting subscriber's terminal;
   receiving the request at the head end;
   acquiring the information at the head end;
   adding a unique identifying number, associated with the requesting subscriber's terminal, to the information;
   transmitting the information on the trunk line;
   storing the information in the frame store;
   modulating a carrier frequency, associated with the identifying number, with the information;
   transmitting the modulated carrier frequency on the feeder line;
   tuning the requesting subscriber's terminal to the carrier frequency; and
   tuning all other subscriber terminals to frequencies other than the carrier frequency.

37. A television information system for transmitting video picture information to television receivers at subscriber terminals on a distribution system, said distribution system including a head end and at least one feeder line connected between said head end and said subscriber terminals, said television information system comprising:
   information storage means for storing video picture information;
   information retrieval means coupled to said information storage means for retrieving video picture information from said information storage means;
   control means connected to said information retrieval means and said feeder line for capturing and storing the video picture information retrieved by said information retrieval means, said control means including transmission means for transmitting the video picture information along said feeder line to one of said subscriber terminals on a television channel dedicated to said one subscriber terminal.

38. A television information system for transmitting information to television receivers at subscriber terminals on a distribution system including a head end and feeder lines connected between said head end and said subscriber terminals, said television information system comprising:
   information storage means for storing information;
   information retrieval means coupled to said head end and said information storage means for retrieving specified information from said information storage means upon request by one of said subscriber terminals, said one subscriber terminal including request means for requesting the specified information and transmitting a request to said information retrieval means over said distribution system; and
   control means coupled to said information retrieval means and said feeder line associated with said one subscriber terminal for capturing the specified information from said information retrieval means, said control means including storage means for storing the specified information and transmission means connected to said storage means for repetitively transmitting the specified information stored in said storage means along said feeder line to said one subscriber terminal on a television channel dedicated to said one subscriber terminal.

* * * * *